(12) United States Patent
Shvedchikov et al.

(10) Patent No.: US 6,224,653 B1
(45) Date of Patent: May 1, 2001

(54) ELECTROSTATIC METHOD AND MEANS FOR REMOVING CONTAMINANTS FROM GASES

(75) Inventors: Adolf Pavlovich Shvedchikov; Aleksander Zalmanovich Ponizovsky; Lazar Zalmanovich Ponizovsky; Sergei Petrovich Kryutchkov; Vladimir Yakovlevich Starobinsky, all of Moscow (RU)

(73) Assignee: Pulsatron Technology Corporation, Los Angeles, CA (US)

( * ) Notice: Subject to any disclaimer, the term of this patent is extended or adjusted under 35 U.S.C. 154(b) by 0 days.

(21) Appl. No.: 09/222,072

(22) Filed: Dec. 29, 1998

(51) Int. Cl.[7] .................................................. B03C 3/013
(52) U.S. Cl. .......................... 95/58; 95/81; 96/52; 96/74; 96/82; 96/97; 204/157.3; 323/903; 361/235; 422/186.04; 422/186.15
(58) Field of Search ................................ 95/79–81, 58–62; 96/80–82, 77, 52, 74, 97; 422/22, 121, 186.15, 186.04; 361/225–235; 323/903; 204/157.3

(56) References Cited

U.S. PATENT DOCUMENTS

| | | | |
|---|---|---|---|
| 2,841,242 | * | 7/1958 | Hall ........................... 95/58 |
| 4,472,174 | * | 9/1984 | Chuan ........................ 95/58 |
| 5,248,324 | * | 9/1993 | Hara ...................... 96/97 X |
| 5,449,390 | * | 9/1995 | Duncan et al. ........ 96/74 X |
| 5,542,967 | * | 8/1996 | Ponizovsky et al. ...... 96/82 |
| 5,567,226 | * | 10/1996 | Lookman et al. .... 95/58 X |
| 5,601,633 | * | 2/1997 | Ponizovsky et al. ...... 95/81 |
| 5,648,049 | * | 7/1997 | Jones et al. ............ 95/58 X |
| 5,707,422 | * | 1/1998 | Jacobsson et al. .... 96/52 X |
| 5,893,943 | * | 4/1999 | Durham et al. ....... 96/74 X |

FOREIGN PATENT DOCUMENTS

| | | | |
|---|---|---|---|
| 1141308 | * | 2/1983 | (CA) ........................... 95/58 |
| 1406109 | * | 9/1975 | (GB) ........................... 95/58 |

* cited by examiner

Primary Examiner—Richard L. Chiesa
(74) Attorney, Agent, or Firm—Robert Louis Finkel (57) ABSTRACT

An electrical apparatus includes a reaction chamber. A stream of contaminated gasses flows through the chamber. An elongated coronating electrode is positioned in the reaction chamber for producing a corona discharge within the chamber. A multi-stage Fitch generator connected to the electrode produces a high level, rapidly pulsating voltage in the electrode. Controlled amounts of an inert gas or inert gas-air mixture are combined with the contaminated gases to provide a high concentration of inert gas in the reaction chamber. In the inert gas-enriched atmosphere, the pulsating corona discharge produces a high concentration of meta-stable intermediates that greatly increase the rate of chemical conversion of the contaminants. Switching circuitry allows the pulsating voltage output of the Fitch generator to be superimposed on a constant direct current voltage in the electrode, setting up an electrostatic field in the reaction chamber for removing conversion byproducts from the gas stream.

15 Claims, 7 Drawing Sheets

ELECTROSTATIC METHOD AND MEANS FOR REMOVING CONTAMINANTS FROM GASES

BACKGROUND OF THE INVENTION

1. Field of the Invention

The present invention relates to the electrostatic removal of contaminants from air and industrial and domestic gases, and more particularly to the use of a very short duration, high voltage pulsating electrical corona discharge for that purpose. Still more particularly, it provides an improved method and highly effective apparatus for enhancing the capacity of the pulsed corona to modify the molecular structure of, and destroy, pollutants.

2. Prior Art

Prior art systems for removing or destroying pollutants fall generally into one of three categories. One type utilizes catalysts to achieve the desired result. A second employs thermal technology. A third involves some form of electrical discharge in a reaction chamber. Depending on the pollutant and the operative conditions, each has its advantages and deficiencies. For the removal of contaminants from fluids, and particularly gases, the first two suffer from a number of inherent disadvantages. Catalytic converters are usually specific to a particular contaminant and may in fact be impaired or even destroyed by combinations of contaminants or contaminants and ambient conditions. Additionally, they require the input of energy to propel the contaminated gas through the catalytic matrix and to heat the waste stream. Thermal systems, from simple incinerators to esoteric plasma furnaces, tend to be highly inefficient, employing large amounts of fuel or electrical energy-producing resources to heat waste stream temperatures to their operational levels. In operation, they require elaborate containments and controls to handle temperatures ranging from 400° C. to over 6000° C. Commonly, they produce substantial quantities of ash and other solid, frequently hazardous, byproducts the removal and disposal of which in themselves pose a variety of logistical and ecological problems. Electrostatic precipitation devices, while certainly not without limitations, avoid many of the deficiencies inherent in the catalytic and thermal devices and afford a number of significant advantages over the other two types of systems.

Among the electrostatic precipitators, corona discharge reactors are especially well suited to dealing with contaminants in gaseous media. One such electrostatic system in particular shows great promise for removing noxious substances from gases. This device and the method embodied in its use are disclosed in U.S. Pat. Nos. 5,542,967 and 5,601,633. The apparatus includes a reaction chamber through which a stream of the gases to be cleaned passes. An electrode extending axially through the chamber is connected to means for producing a high level pulsating voltage superimposed on a constant direct current. The pulsating high voltage gives rise to a streamer corona discharge within the reaction chamber creating a flow of high-speed electrons which activate and ionize the gas molecules to convert the pollutants into non-noxious aerosols and solid particles. The aerosols and solid particles are removed from the gases in the reaction chamber by the electrostatic conductive field associated with the constant direct-current voltage. In the preferred embodiment of the patented device, a multi-stage Fitch generator is adapted to produce the output current.

The effectiveness of the cleaning process in this device depends on the density and the energy of the electron flow generated by the streamer corona discharge. Both of these parameters rise with increasing pulse amplitude and with increasing steepness of the pulses. The pulse steepness is an important factor because the pulse amplitude that can be achieved without electrical breakdown of the inter-electrode space in the reaction chamber is a function of pulse steepness.

As employed in the patented device, the Fitch generator is particularly well suited to provide pulsating voltages of sufficiently high amplitude and steepness to produce a high density, high energy corona discharge within the chamber. Advantageously, it does so without substantially increasing the temperature within the chamber. Additionally, the Fitch generator is extremely efficient from an energy consumption point of view so that the process may be carried on for long periods of time without consuming excessive amounts of electric power. Still further, in developing, experimenting with, and testing the patented apparatus, we have noted that the electrostatic mechanism (we refer to it as "molecular alteration") underlying its operation has the potential not only to destroy pollutants and contaminants in both gaseous and liquid environments, but to effect profound changes in the molecular structure and properties of gaseous, liquid, and solid materials as well.

For all of their advantages, precipitators of this type suffer from certain deficiencies. Principal among these is their high degree of unpredictable sensitivity to temperature, humidity, pollutant concentration, and flow rate. By way of example, in dry air at room temperature and levels of 200–500 parts per million we have demonstrated the ability of one such device to destroy as much as 97% of certain pollutants, such as $NO_x$. At levels of 500–1,000 parts per million under the same conditions, however, the destruction rate fell to 60% to 73%. In wet air (water vapor content of 5% by volume) and at elevated temperatures (135° C. to 140° C.), the same device consistently removed between 80% and 90% of the $NO_x$ molecules at levels of more than 1,000 ppm and up to 10,000 ppm while running continuously for sustained periods of time. Similar disparities are noted in the destruction rate with varying concentrations, temperatures, humidities, and flow rates with various organic and inorganic pollutants, such as nitrogen oxides (NO), ammonia ($NH_3$), sulfur dioxide ($SO_2$), toluene, tetrachloroethylene, and trichloroethylene.

To overcome these inconsistencies and achieve more reliable removal of pollutants, it has been an objective of our efforts to discover methods and means for enhancing the operation of the corona discharge mechanism. Toward this end, we have carried out a program of experimentation to determine the influence of the inert (referred to interchangeably as "noble") gases, helium, neon, argon, krypton, xenon, and radon, on the corona discharge function. As will be shown, the results demonstrate that, properly utilized, inert gases can profoundly enhance the electrochemical process and substantially and unexpectedly increase the rate and amount of pollutant destruction and removal in waste gases. The subject invention relates generally to our discoveries concerning the utilization of inert gases for this purpose and particularly to novel methods and means utilizing inert gases to enhance the reliability and effectiveness of corona discharge-type electrostatic devices.

While our invention is of broad, general interest in the field of pollution removal by means of electrostatic precipitation, we have identified several areas in which it is of particular utility. In one, the manufacture of semiconductor chips, various processes are carried out in controlled atmospheres of pure or high concentrations of inert gases. The by-products of these processes contain such highly toxic pollutants as sulfur dioxide ($SO_2$), toluene ($C_7H_8$), tetrachloroethylene ($C_2Cl_4$), arsine ($AsH_3$), stybine ($SbH_3$), phosphine ($PH_3$), and the like. In another, the attempted destruction of well-known environmentally noxious wastes by incineration, the off-gases commonly contain dangerous quantities of hazardous organic and chloroorganic compounds, such as, benzene ($C_6H_6$) and chlorobenzene ($C_6H_5Cl$) resulting from incomplete combustion. Our method and apparatus are especially advantageous in these industrial settings. In the former, because the discharge from the manufacturing processes already contains a high concentration of inert gas, in the latter, because the effluent lends itself to electrostatic precipitation with the addition of the necessary concentration of inert gas.

It is an object of the present invention to provide a novel inert gas-enhanced electrostatic method and apparatus for removing pollutants from gases.

Another object of the invention is to provide a unique gas cleaning method and apparatus that utilize the inert gases under controlled conditions in connection with a high-voltage pulse streamer corona.

Still another object is to provide an improved gas cleaning method and apparatus that utilize the inert gases under controlled conditions to enhance the capacity of an electrostatic precipitator comprising:

(1) A high voltage power supply capable of generating voltage pulses of the high amplitude and steepness required for producing a high density energy flow within a precipitation reaction chamber;

(2) A power supply which is extremely efficient from an energy consumption point of view so that the apparatus may operate normally at low temperature for extended periods of time; and (3) A precipitation reaction chamber which includes a high voltage corona-producing electrode that responds to the high voltage pulses from the power supply to generate a pulse streamer corona of sufficiently high current to enable the transfer of the required amount of electrical power into the gases in the precipitation chamber to activate and ionize the gas molecules to produce non-noxious aerosols and solid particles, and which is adapted to provide an atmosphere that will sustain the corona discharge at a voltage sufficiently high to destroy the entrained pollutants without electrical breakdown that destroys the pulsed corona effect.

Yet another object is to provide an improved novel gas cleaning method and apparatus which utilize an inert gas under controlled conditions to enhance the capacity and efficiency of an electrostatic precipitator of the type described in the immediately preceding paragraph in which the power supply contains a multi-stage pulse generator.

A further object of the invention is to provide a novel gas cleaning method and apparatus of the type described above, wherein the power supply includes a Fitch pulse generator.

A still further object is to provide a gas cleaning method and apparatus of the type described, incorporating circuit means for selectively superimposing the high level pulsating voltage on a constant direct current voltage for use in appropriate applications.

Still another object of the invention is to provide an electrostatic gas cleaning method and apparatus of the general type described herein, embodying a novel electrode to enhance the corona discharge within the reaction chamber.

Other objects and further applications will become apparent from the summary of the invention and description of its preferred embodiment that follow.

SUMMARY OF THE INVENTION

To achieve the foregoing objects, we have combined in the subject invention the features, functions, and operation of the electrostatic precipitator inventions disclosed in U.S. Pat. Nos. 5,542,967 and 5,601,633 with methods and means for introducing predetermined amounts of one or more of the inert gases into the waste stream passing through the precipitator's reaction chamber.

The subject device employs a nano-second, high-voltage pulse corona electrical discharge to alter the structure of noxious molecules in gases or liquids within the reaction chamber. The corona discharge accomplishes this by initially creating a high concentration of fast electrons, which release chemically active intermediates, such as ions, atoms, radicals, and excited molecules having an excess of kinetic, vibrational, and electronic energy. In an atmosphere of air, this energy can change complex molecules into simplified compounds, such as water, carbon dioxide, nitrogen, and various benign organic and inorganic substituents. The introduction of an inert gas into the reaction chamber provides a source of additional highly unstable metastable atoms, which markedly increase the chemical reaction rate. The result greatly enhances the reliability and destructive capacity of the device.

As in the patented device, the high voltage pulses are generated in the apparatus of the present invention by a Fitch pulse generator, which is energized by the same power supply as is used for producing the constant direct-current voltage. The Fitch generator includes an odd number (typically $2n+1$) of series-connected power storage units. Each set of three sequential power storage units forms a stage of the generator, with each third unit of each stage also forming the first unit of the subsequent stage. In this configuration, an n-stage Fitch pulse generator produces high voltage pulses superimposed on a constant charge direct current voltage, with the amplitude of the high voltage pulses being $(2n+1)$-times as high as the constant charge voltage.

The Fitch pulse generator is connected in parallel with the precipitation reaction chamber, and the first power storage unit of the Fitch generator is connected directly to the output of the power supply.

As will be explained in detail below, under certain conditions, the field produced by DC voltage in the coronating current will not support the accumulation of highly charged metastable intermediaries in an atmosphere containing noble gases. When electrical breakdown occurs, the ensuing arcing between the coronating electrode and the wall of the reaction chamber impedes, and may effectively counteract, the intended reaction. To accommodate these situations, the subject invention provides a modified 2n-stage Fitch generator, or switch means for selectively converting the odd numbered $(2n+1)$-stage Fitch generator to an even numbered $(2n)$-stage generator, thereby eliminating the DC component from the pulsed, corona-producing output current to the reactor electrode. The result of the elimination of the DC field from the pulsed corona greatly enhances the operation of the patented reactor when it is employed with the noble gases.

The marked increase in the efficiency of pollutant decay using noble gases may be explained by the mechanism which involves the reactions of metastable noble gas atoms $M^*$, ($He^*$, $Ne^*$, $Ar^*$, $Kr^*$, $Xe^*$) as efficient intermediates.

We believe that when noble gases M (He, Ne, Ar, Kr, Xe) are irradiated by fast electrons, the excited metastable singlet or triplet atomic states $M^*$ appear. The energy of $M^*$ depends on the particular noble gas (M) involved. For example, for He atoms, the energies of singlet ($^1S_0$, $^1P_1$, $^1D_2$, $^1F_3$) and triplet $^3S_1$, $^3P_{2,1}$, $^3P_0$, $^3D_{3,2,1}$, $^3F_{4,3,2}$) states are in the range 19.8–24 eV, for Ne, 18–21 eV, for Ar 13–14 eV, for Kr 11–13 eV, and for Xe 10–11 eV. Because the ionization potentials (IPs) of most organic and inorganic substances are not higher than 13–14 eV (for example, IP for $NH_3$=10.5 eV, for $H_2O$=12.5 eV, for $O_2$=12.2 eV, for NO=9.5 eV, for toluene=8.8 eV, for tetrachloroethylene=8.8 eV, for methyl ethyl ketone (MEK)=9.7 eV, etc.), the metastable states (eg., He* and Ar*) may ionize or destroy chemical bonds of most known organic and inorganic substances including such hazardous pollutants (P) as $NO_x$, $SO_2$, $NH_3$, $AsH_3$, $PH_3$, hydrocarbons, and chlorosubstituted hydrocarbons, etc. by reactions as follows:

M*(He*, Ar*, etc.)+P—>M+P+(or M+products)

The life time of M* is considerably higher than the life time of ions, so M* plays the role of a "chemical capacitor." It accumulates energy obtained from fast electrons and later transfers this energy to receptive molecules, for example, P, destroying them because they are not involved in the chemical process. This process is known in radiation chemistry as "noble gas sensibilitation," that is, the enhancement (catalysis) of chemical reactions through the transfer of energy.

The operation and advantages of the subject invention will be clear from the following discussion of the results of our experimentation, and the accompanying detailed description of the preferred embodiments of the invention.

BRIEF DESCRIPTION OF THE DRAWINGS

The preferred embodiment of the invention will now be described in conjunction with the following drawings, in which:

FIG. 1b is a rear perspective view of the installation of FIG. 1a;

DETAILED DESCRIPTION OF THE ILLUSTRATED EMBODIMENT

The Preferred Embodiment

Figure 1A:
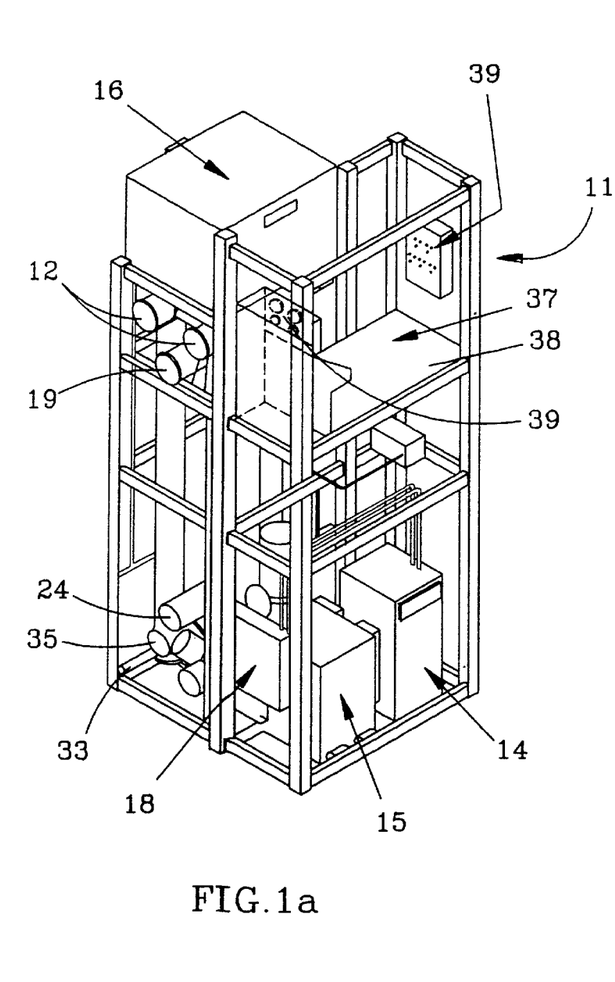
FIG. 1a is a front perspective view of an operational installation incorporating the electrostatic precipitation invention disclosed in U.S. Pat. Nos. 5,542,967 and 5,601,633, which has been modified in accordance with the subject invention.
Figure 1B:
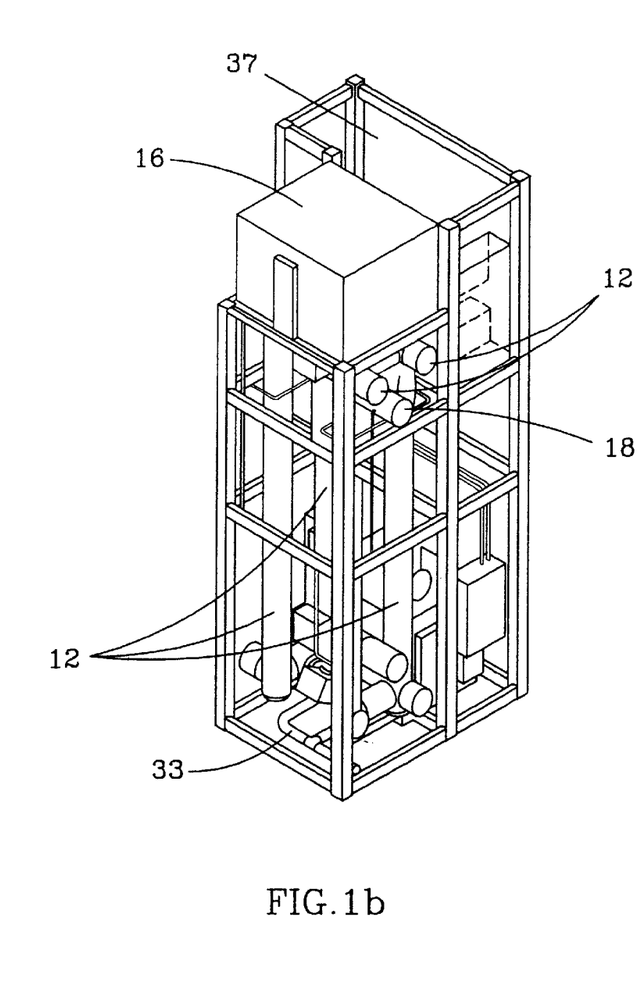
Figure 2:
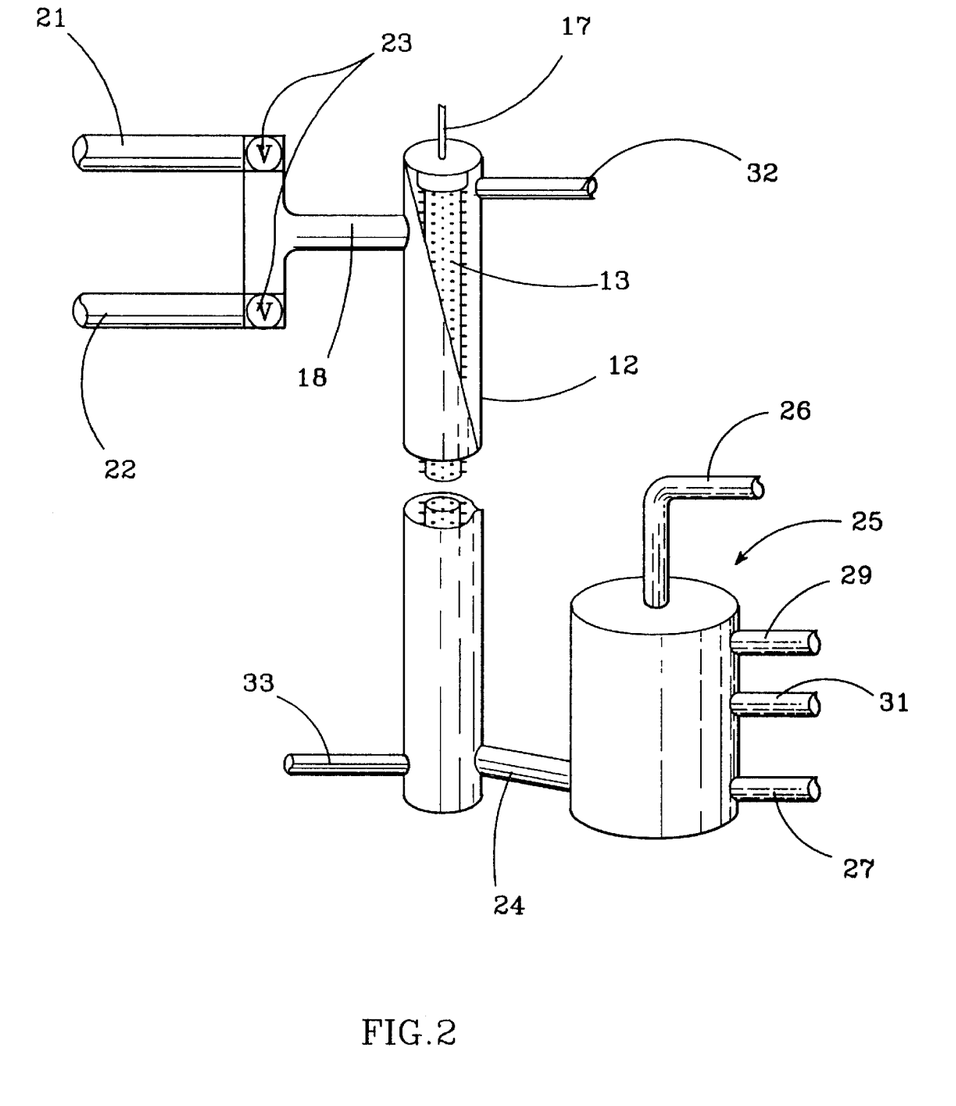
FIG. 2 is a schematic diagram showing the flow path of waste gas and inert gas through the installation of FIGS. 1a and 1b.

Referring to FIGS. 1a, 1b, and 2, an operational installation 11 of an electrostatic precipitator in accordance with the subject invention is fabricated as a unitary structure occupying a space that measures approximately 12'×12'×22'. The structure contains four grounded cylindrical corona electric reaction chambers 12. Each chamber 12 is about 12' long and 12" in diameter and contains a coronating electrode 13 mounted coaxially with its central axis. A variable transformer 14 and transformer rectifier 15 feed a high voltage pulse generator 16 (actually a pair of generators) connected in parallel to the leads 17 of electrodes 13. A main power switch panel 18 provides power for the installation 11.

At the upper end of each reaction chamber 12, an inlet 18 is provided for attachment to a source 21 of contaminated gas, such as the waste stream from a plasma furnace or industrial incinerator system or the exhaust from a manufacturing facility, and a source 22 of inert gas (not shown). Conventional valves 23 control the flow of waste gas and inert gas into the common inlet 18 for mixing prior to entry into the reaction chambers 12. Alternatively (not shown), the waste gas and inert gas sources may be connected to the reaction chambers 12 through separate inlets, each provided with its own control valve mechanism, for mixing within the reaction chambers 12.

Each reaction chamber 12 is provided with an outlet 24 at its lower end for scavenging the combined reaction byproducts, inert gas, and any remaining contaminated gas. Preferably, but not necessarily, outlet 24 is connected to a conventional gas scrubber 25 having a water inlet 26 connected to a source (not shown) of scrub water and a water drain 27 for disposing of spent scrub water. Scrubber 25 serves to recover 85–90 percent of the inert gas passing through the reaction chamber 12. The recovered inert gas is discharged through an outlet 29. The scrubbed reaction byproducts and remaining contaminated gas are discharged through an outlet 31, whence they are subjected to appropriate treatment. It will be understood that the specific construction of the inlets, outlets, and plumbing, and the disposition of the waste stream and inert gas discharge are matters of choice and form no part of the subject invention.

Separate plumbing, including wash water inlets 32 with appropriate internal spray heads (not shown), and wash water drains 33, provide means for washing any accumulated residue from the inner walls of reaction chambers 12 and electrodes 13. Access ports 35 afford means for inspecting and servicing the reaction chambers 12, and in the alternative embodiment mentioned earlier, may provide entry for the inert gas and other gaseous reagents.

A control room 37 houses a control console 38 containing the main instruments and controls for monitoring and managing the operation of the installation. A separate valve control panel 39 contains the instruments and controls for monitoring and managing the flow of waste gas, inert gas, and scrub and wash water through the reaction chambers 12 and scrubber 25.

Figure 3:
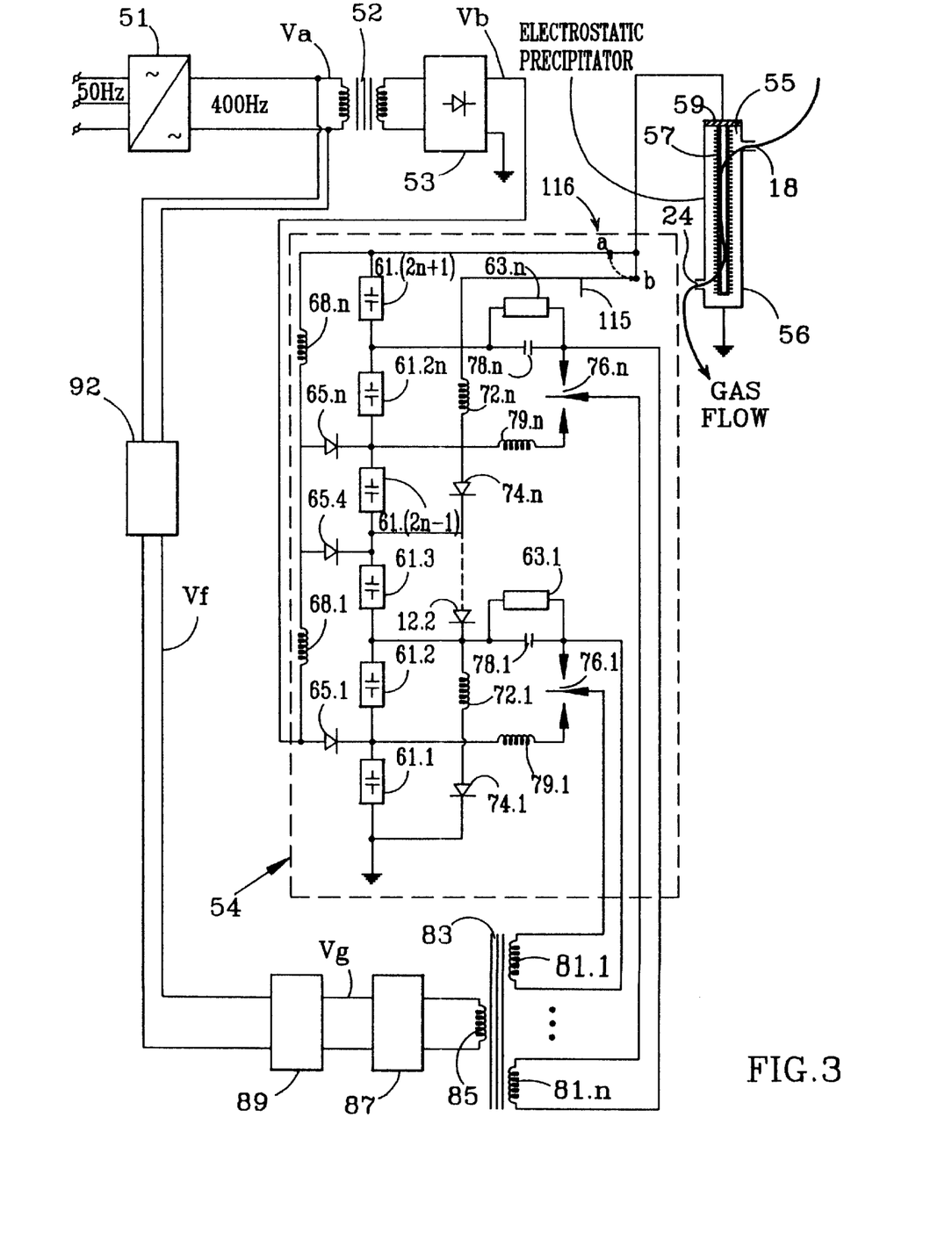
FIG. 3 is a general circuit diagram of the electrical circuitry of the electrostatic precipitation apparatus of FIGS. 1a, 1b, and 2.

Referring to FIG. 3, the circuitry of the apparatus of U.S. Pat. Nos. 5,542,967 and 5,601,633 includes a frequency convertor 51 for converting 3-phase 50 Hz AC line voltage into 400 Hz single-phase AC voltage. A single-phase high voltage transformer 52 is connected to the output of convertor 51, and this transformer raises the 400 Hz AC voltage from convertor 51 to a voltage having an amplitude of, for example, 30–100 kV. The AC voltage from transformer 52 is rectified in a rectifier 53. The negative output terminal of rectifier 53 is grounded, and the positive terminal is connected to a Fitch pulse generator 54, which is connected to reaction chamber 55.

The reaction chamber 55 of the electrostatic precipitator includes a grounded cylindrical casing 56 formed, for example, of stainless steel. An elongated corona-producing collector electrode 57, likewise formed of stainless steel, extends coaxially with the cylindrical casing 56 into the reaction chamber. Electrode 57 is mounted in the grounded casing 56 by an insulating member 59 which causes the electrode to be insulated from the casing. The casing forms a second electrode for the electrostatic precipitator.

Fitch pulse generator 54 is an n-stage pulse generator. It is connected between collector electrode 57 of the precipitator and ground. The Fitch pulse generator 54 includes power storage units, such as, industrial high voltage (50 kV) capacitors 61 each having a capacitance of approximately 0.15 mf, and high voltage 60–100 watt resistors 63.1-63.n each having a resistance of 100–10,000 ohms. The Fitch generator 54 includes 2n+1, an odd number of power storage units 61.1 . . . 61.(2n+1) connected in series. Each of the power storage units may be in the form of a single high voltage capacitor of the type described above, or may be formed of a group of such capacitors.

The odd number connecting points of the power storage units 61.1 . . . 61.(2n-1) are connected to electrode 57 through respective oscillation damping diodes 65.1-65.n and through series-connected inductance coils 68.1-68.n. The even number connecting points of the power storage units 61.2 . . . 61.2n are connected to ground through series-connected inductance coils 72.1 . . . 72.n, and oscillation damping diodes 74.1 . . . 74.n. The positive terminal of rectifier 53 is connected to the common junction of diode 65.1 and inductance coil 68.1. Frequency converter 51, transformers 52, and rectifier 53 form the power supply for the apparatus.

Triggering circuits, including switches 76.1-76.n having respective first main electrodes connected in series with respective capacitors 78.1-78.n and resistors 63.1-63.n, have their first and second main electrodes connected in parallel with the even power storage units 61.2 . . . 61.n, through the capacitors 78.1-78.n and resistors 63.1-63.n and inductance coils 79.1-79.n, respectively. Each of the switches 76.1 . . . 76.n has a trigger electrode connected to one terminal of corresponding secondary windings 81.1 . . . 81.n of a pulse transformer 83. The first main electrodes of switches 76.1 . . . 76.n are each connected to the other terminal of the corresponding secondary windings 81.1 . . . 81.n of transformer 83. In an alternative embodiment of the patented device, thyratrons and appropriate connecting circuitry (not shown) are employed in place of the aforementioned triggering circuits.

The primary winding 85 of pulse transformer 83 is connected to the output of an ignition pulse generator 87 whose controlling input circuit is connected to the output of a frequency divider 89. The controlling input circuit of frequency divider 89 is connected to the output of a phase shifting network 92 which, in turn, is connected to frequency convertor 51. The phase shifting network 92 (circuitry not shown in detail) produces an output pulse each time the AC voltage from convertor 51 (appearing across the primary winding of transformer 52) approaches zero.

In the operation of a typical example of the patented device, the output of rectifier 53 charges power storage units 61.1, 61.2, and 61.3. A pulse from frequency divider 89 induced by phase shifting network 92 causes ignition pulse generator 87 to introduce a voltage pulse across the primary winding 85 of pulse transformer 83. This results in a high voltage pulse appearing across the secondary winding 81.1, which results in a breakdown of switch 76.1 and causes an oscillating circuit to be formed which includes power storage unit 61.2 and discharge inductance 79.1. The ensuing oscillatory action recharges power storage unit 61.2 with a cycle of 100–400 ns. Since the voltage on power storage units 61.1 and 61.3 remains essentially constant, and the voltage on power storage unit 61.2 changes its sign during the oscillation period, the full output voltage of the first stage of the Fitch power generator becomes a sum of approximately three charged voltages.

In general a Fitch pulse generator in this configuration having n stages, i.e., (2n+1)-power storage units charged to a voltage U superimposes over the constant DC charged voltage a pulsating voltage which has an amplitude approximately equal to 2nU. This pulsating voltage and the constant DC voltage are applied to the corona-producing electrode 57 and give rise to a corona streamer discharge in chamber 55. The current pulse amplitude and duration depend on the geometry of the chamber and on the steepness, amplitude, and frequency of the voltage pulse.

The corona streamer discharge produces a high-density, high-energy electron flow in the gas stream moving through the chamber. The discharge has sufficient intensity to ionize the pollutants in the stream and initiate their chemical reaction. These reactions result in the conversion of the noxious substances in the gas into aerosols or solid particles which are removed from the gas by the field produced by the constant DC voltage fed to the electrode 57.

Experimental Findings and Conclusions

Experience suggested that the inert gases might enhance the ability of the pulse corona discharge of the patented precipitator to destroy certain inorganic and organic pollutants such as nitrogen oxides $NO_x$, ammonia ($NH_3$), sulfur dioxide ($SO_2$), toluene ($C_6H_5CH_3$), and tetrachloroethylene ($C_2Cl_4$). Experiments were conducted to test the hypothesis utilizing the 2n+1-stage Fitch generator of the apparatus described in U.S. Pat. Nos. 5,542,967 and 5,601,633 to produce a high voltage pulsed current imposed on a constant DC voltage for energizing the precipitator electrode.

The testing was carried out with two different precipitators. One employed a small stainless-steel reaction chamber with an inner diameter of 70 mm (volume 1.5 l) and waste gas flow rate of 0.5 l/min. The other embodied the structure illustrated in FIGS. 1a, 1b, and 2, with four reaction chambers having inner diameters of 30 cm, a total volume of 1000 liters, and a cumulative waste gas flow rate of 900 1/min. In both installations, the corona discharge was excited in the gap of an electrode system mounted coaxially with the grounded walls of the reaction chamber or chambers.

Figures 14, 15:
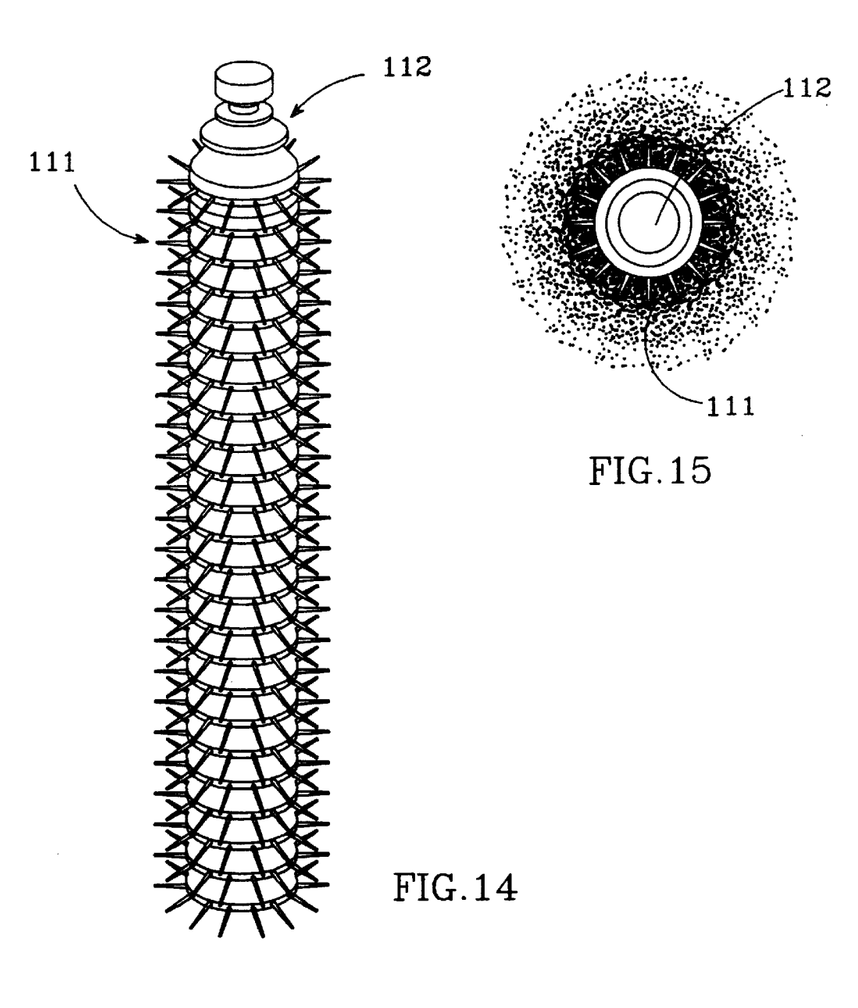
FIG. 14 is a perspective view of an improved corona generating electrode embodying the subject invention.
FIG. 15 is a top view of the corona generating electrode of FIG. 14 illustrating the appearance of a typical high voltage pulse discharge corona.

In the first device, a corona-forming stainless-steel wire electrode 1-mm in diameter was mounted on two Teflon insulator bushings. The leading edges of the DC current and voltage pulses appeared at 150–200 ns with a pulse duration of approximately 350 ns. The high voltage pulse amplitude was from 30 to 75 kV. The pulse current was from 50 to 100 A, and the pulse frequency from 2 to 50 pulses per second ($s^{-1}$). The DC voltage was from 10 to 25 kV. In the second device, a multi-edged serrated stainless-steel corona-forming electrode 111 as illustrated in FIGS. 14 and 15 was mounted on the central axis of each of the four reaction chambers by means of ceramic bushing insulators 112. The DC-voltage was 40 kV, the pulse voltage 120 kV. The leading edges of the current and voltage pulses appeared at 70 ns, and the pulse duration was 200 ns. The maximum pulse corona current was 2000 A, and its frequency was 120 pulses $s^{-1}$.

The latter model of precipitator was used for testing the effect of the presence of a typical inert gas, argon (Ar) on the rate of destruction of NOx (NO and $NO_2$) and $NH_3$ at temperatures ranging from 20° to 70° C. in wet air (5% $H_2O$ by vol.) at a flow rate of 55 m³/hour. The overall effect of the pulsed corona discharge was to oxidize NO into $NO_2$ that reacted with available ammonia $NH_3$ to produce ammonium nitrate salt ($NH_4NO_3$) as a final product. After several hours of operation, the high voltage was switched off and the inner walls of the reaction chambers washed with water to remove the salt deposits. The influence of Ar on the percentage of destruction (conversion) of NO, $NO_2$, and $NH_3$ by the pulsed corona discharge in a steady DC-induced field is presented in Table 1.

corona must be produced at the highest possible voltage. In the presence of the DC field associated with the (2n+1)-stage Fitch generator of the patented precipitator, at high voltages high concentrations of inert gas experience breakdown. The resulting arcing destroys or seriously degrades the effect of the pulse corona discharge.

One solution to the breakdown problem is to reduce the Fitch generator output voltage to the reactor terminal. Unfortunately, as indicated in Table 1 lowering the corona-producing voltage reduces the pollutant conversion rate. Another solution is to use the noble gases (He, Ne, Ar, Kr, Xe) in the patented device only in conjunction with electronegative gas pollutants, such as oxygen ($O_2$), carbon dioxide ($CO_2$), and sulfur hexaflouride ($SF_6$), in which arcing does not occur.

Figure 4:
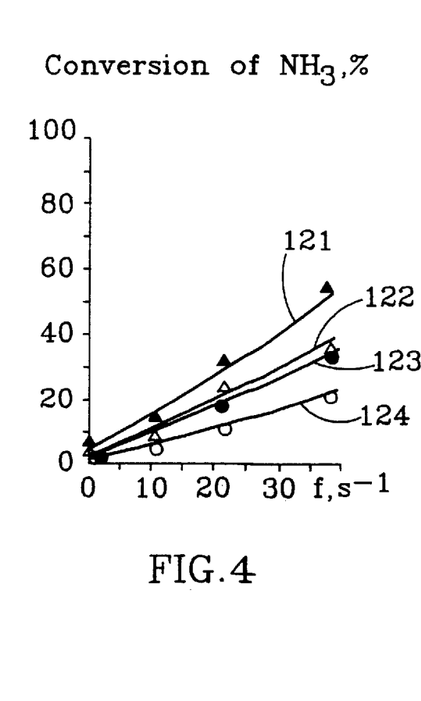
FIG. 4 is a graph comparing the effect of concentration of ammonia on the conversion of ammonia in mixtures of ammonia with air and with air and helium.

A third solution is to operate the device at inert gas/air concentrations of less than about 70% by volume. At higher concentrations, the limit voltage before breakdown continuously decreases to 11 kV for pure Ar and 4 kV for pure He. Such low voltages cannot create a high concentration of highly charged metastable intermediaries, and accordingly the conversion rate is unacceptably low. As shown in FIG. 4, however, the presence of the DC field of the patented device on the destruction of $NH_3$ in a mixture of air and He exacerbates this problem. The conversion of $NH_3$ at both 375 ppm and 900 ppm is greater in mixtures of air-He (70%)-NH3 than in $NH_3$-air alone, but the limit voltage in the presence of a DC corona is 16 kV, and for a pulse corona it is 48 kV For this reason, the conversion of $Nh_3$ at a concentration of 900 ppm is only about 30%. Obviously, none of these solutions is fully satisfactory.

The subject invention addresses the conflict between the requirement for a high-voltage corona discharge and the tendency of higher concentrations of noble is to suffer electrical breakdown by doing away with the DC component of the output current of the Fitch power generator and by providing for the entrainment of variable mixtures of air,

TABLE 1

| Inlet concentr. of $NO_x$, ppm | Inlet concentr. of NH, ppm | Inlet concentr. of Ar, % | Outlet concentr. of NO, ppm | Outlet concentr. of NO, ppm | Outlet concentr. of NH, ppm | Conversion of NO + $NO_2$ % | Conversion of $NH_3$ % |
|---|---|---|---|---|---|---|---|
| 3000 | 5000 | 0  | 1100 | 310 | 3600 | 53   | 28 |
| 3600 | 5000 | 17 | 1145 | 235 | 3500 | 61.6 | 30 |
| 3400 | 5000 | 23 | 980  | 220 | 3400 | 64.7 | 32 |

Table 1 shows that in the presence of low to moderate concentrations of Ar, as predicted, the conversion of $NO_x$ and $NH_3$ by the patented precipitator increased with the concentration of the inert gas. The results with respect to $NH_3$ are particularly significant, since gaseous ammonia and other, extremely dangerous, hydrides such as arsine ($AsH_3$), stybine ($SbH_3$), phosphine ($PH_3$) found in industrial effluent exhibit similar chemical behavior.

These early experiments indicated that the patented precipitator could be used advantageously to convert various organic and inorganic pollutants associated with the manufacture of semi-conductor chips and other chemical industrial processes that take place in atmospheres of inert gas. When the single reaction chamber test device was modified to mirror the multi-chamber reactor, however, it did not operate as well in atmospheres of pure Argon (Ar) or Helium (He). Investigation revealed this was primarily because of the very low electric strength of the inert gases (11 kV for Ar and 3.5 kV for He). To operate at peak efficiency, the pollutant, and inert gas in the reaction chamber. To achieve this result, we modify or alternatively provide for the selective modification of the patented precipitator to utilize two stages (in general 2n-stages) of power storage units in place of the three stages ((2n+1) stages) in the Fitch generator.

Referring to FIG. 3, the circuit of the precipitator of U.S. Pat. Nos. 5,542,967 and 5,601,633 is modified most readily by connecting the even number connecting points of power storage units 61.2 . . . 61.2n of Fitch pulse generator 54, rather than the odd number connecting points of power storage units 61.1 . . . 61.(2n+1), to electrode 57 (configuration not shown).

In the preferred embodiment of the subject invention, greater flexibility and utility are achieved by providing a switch circuit 115 containing a switch 116 by means of which the pulse generator 54 can be adjusted at will to serve as either a (2n+1)-stage or a 2n-stage device. In this configuration, when switch 116 is in the position designated "a," the device is in the (2n+1)-stage mode, and its operation is exactly as shown and described in the two aforementioned patents. The current delivered to electrode 57 comprises a succession of high-voltage pulses superimposed on a direct current voltage. When the switch is in position "b", generator 54 is in the 2n-stage mode, and electrode 57 produces only a high-voltage, nano-second pulse corona discharge. The duration of the pulse is too short to produce electrical breakdown in high concentrations of the inert gases. This in turn allows the precipitator to be operated at higher voltages, thereby increasing the efficiency of conversion of ecologically noxious pollutants under the influence of the noble gases. With this arrangement, we have consistently obtained substantial concentrations of electronically excited metastable atoms (He*, Ar*) with energies of 19.8 and 14 eV which is sufficient to ionize most of the toxic inorganic and organic admixtures commonly encountered in the waste emissions of chip production facilities.

Extensive testing was done to evaluate the effectiveness of the subject invention. For this purpose, initially the previously mentioned small reaction chamber with a volume of 1.5l and a waste gas flow rate of 0.5l/min. was used. The reactor included a modified version of the patented precipitator containing a 2n-stage Fitch power generator and means for introducing various combinations and concentrations of inert gas, air, and pollutants into the reaction chamber. This device was used to test typical inorganic and organic compounds such as ammonia ($NH_3$), nitrogen oxide (NO), sulfur dioxide ($SO_2$) toluene ($C_6H_5CH_3$), and tetrachloroethylene ($C_2Cl_4$). The setups, results, and conclusions drawn for the representative examples of these tests depicted in FIGS. 5–13 are described in Table 2 below.

TABLE 2

FIG. 4: EFFECT OF FREQUENCY $f(s^{-1})$ AND CONCENTRATION OF AMMONIA ($NH_3$) ON THE CONVERSION OF $NH_3$ IN AIR/$NH_3$ AND IN AIR/He(70%)/$NH_3$ MIXTURES

Figure 5:
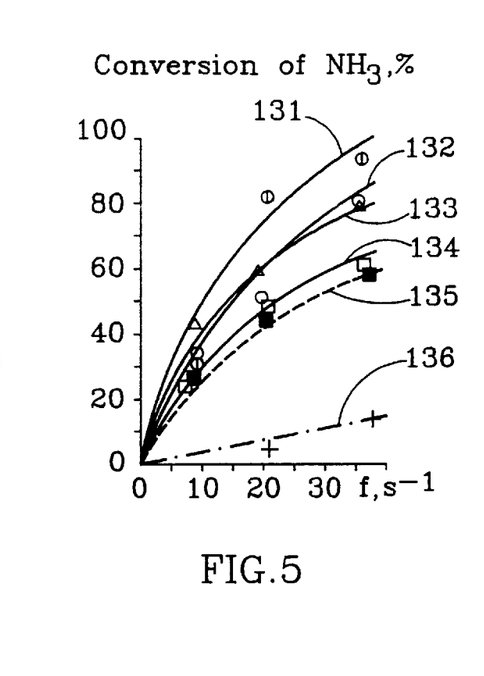
FIG. 5 is a graph comparing the effect of high voltage pulse frequency on the conversion of ammonia in mixtures of ammonia with various types of gases.

Setup:

Temperature = 20° C.
Flow Rate = .5l/min
Stainless-steel Electrode (1 mm)
Chamber Volume = 1.5l
$U_{DC}$ = 16 kV; $U_{pulse}$ = 48 kV
Legend:

121 = Air/He(70%)$NH_3$ (375 ppm);
122 = Air/He(70%)/$NH_3$ (900 ppm);
123 = Air/$NH_3$ (375 ppm);
124 = Air/$NH_3$ (900 ppm)
Findings and Conclusions:

As frequency increases, conversion of $NH_3$ also increases. As the concentration of $NH_3$ increases, the conversion of $NH_3$ decreases. In Air/He(70%)/$NH_3$ mixtures conversion of $NH_3$ is higher than in Air/$NH_3$ mixtures.
 FIG. 5: EFFECT OF FREQUENCY, $f(s^{-1})$ ON THE CONVERSION OF AMMONIA ($NH_3$) IN DIFFERENT TYPES OF GASES Setup:

Temperature = 20° C.
Flow Rate = .5l/min
Stainless-steel Electrode (1 mm)
Chamber Volume = 1.5l
$U_{pulse}$ = 60 kV
Legend:

131 = Air-Ar(70%)-$NH_3$(3700 ppm)-NO(900 ppm);
132 = Air-Ar(70%)-$NH_3$(3700 ppm)

TABLE 2-continued

Figure 6:
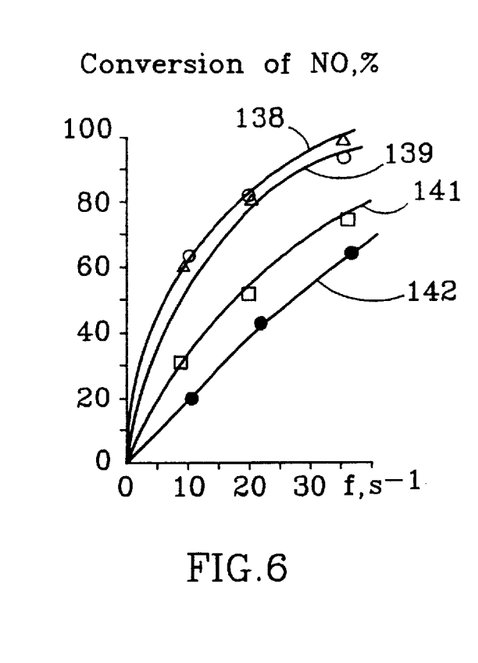
FIG. 6 is a graph comparing the effect of high voltage pulse frequency on the conversion of nitrogen oxide in air and in mixtures of air with ammonia and with argon.
Figure 7:
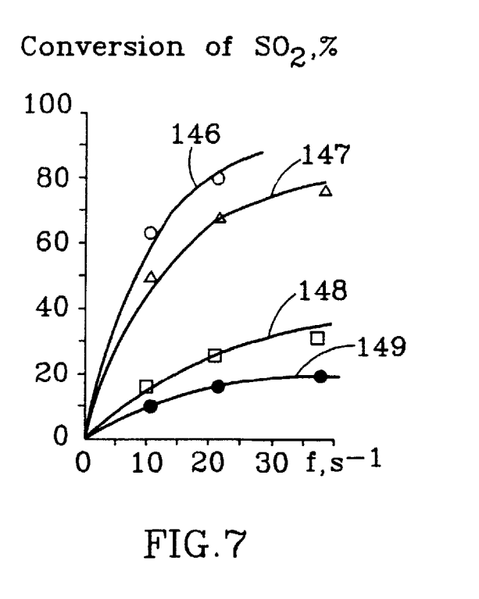
FIG. 7 is a graph comparing the effect of high voltage pulse frequency on the conversion of sulfur dioxide in various types of gases.
Figure 8:
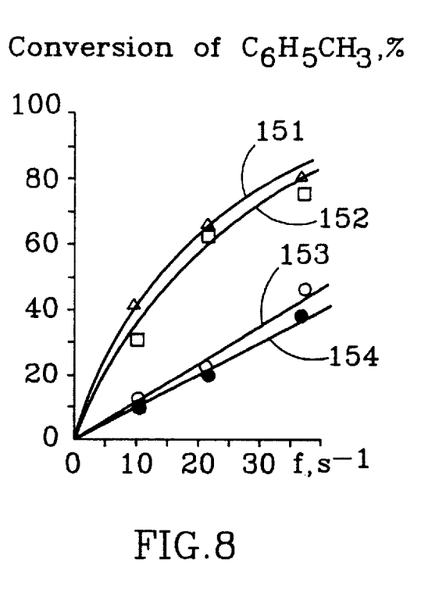
FIG. 8 is a graph comparing the effect of high voltage pulse frequency on the conversion of toluene in various types of gases.

133 = Air-Ar(30%)-$NH_3$(2400 ppm)-NO(1200 ppm)
134 = Air-Ar(30%)-$NH_3$(2400 ppm)
135 = Ar-$NH_3$(2400 ppm)
136 = Air-$NH_3$(3700 ppm)
Conclusions:

The conversion of $NH_3$ in Ar with NO admixtures is considerably higher than in Air. Optimum conversion is with an Ar/Air mixture of from about 30% to about 70% of Ar by volume. The maximum conversion is with an Ar/Air mixture of from about 40% to about 65% of Ar by volume.
 FIG. 6: EFFECT OF FREQUENCY, $f(s^{-1})$ ON THE CONVERSION OF NITROGEN OXIDE (NO) IN AIR AND MIXTURES OF AIR WITH AMMONIA ($NH_3$) AND Ar Setup:

Temperature = 20° C.
Flow Rate = .5l min
Stainless-steel Electrode (1 mm)
Chamber Volume = 1.5l
$U_{pulse}$ = 60 kV
Legend:

138 = Air-Ar(70%)-$NH_3$(3500 ppm)-NO(900 ppm);
139 = Air-Ar(30%)-$NH_3$(2400 ppm)-NO(1200 ppm)
141 = Air-$NH_3$(2400 ppm)-NO(1200 ppm)
142 = Air-NO(1200 ppm)
Conclusions:

As frequency increases, the conversion of NO also increases. Conversion in mixtures of Air/NO/$NH_3$/Ar is considerably higher than in mixtures of Air/NO. Optimum conversion is with an Ar/Air mixture of from about 30% to about 70% of Ar by volume. The maximum conversion is with an Ar/Air mixture of from about 40% to about 65% of Ar by volume.
 FIG. 7: EFFECT OF FREQUENCY, $f(s^{-1})$, ON $SO_2$ CONVERSION IN DIFFERENT TYPES OF GASES Setup:

Temperature = 20° C.
Flow Rate = .5l/min
Chamber Volume = 1.5l
Stainless-steel Electrode (1 mm)
Upulse = 60 kV
Initial Concentration of $SO_2$ = 400 ppm
Legend:

146 = Ar
147 = He
148 = Air
149 = $N_2$
Conclusions:

As frequency increases, the conversion of $SO_2$ also increases. Conversion is considerably higher in an atmosphere containing Ar or He than for $N_2$ or Air alone.
 FIG. 8: EFFECT OF FREQUENCY, $f(s^{-1})$, AND THE TYPE OF ATMOSPHERE ON THE CONVERSION OF TOLUENE ($C_6H_5CH_3$)

Setup:

Temperature = 20° C.
Flow Rate = .5l/min
Stainless-steel Wire (1 mm) Electrode
Chamber Volume - 1.5l
$U_{pulse}$ = 60 kV
Initial Concentration of $C_6H_5CH_3$ = 760 ppm
Legend:

151 = Ar
152 = He
153 = $N_2$
154 = Air
Conclusions:

As frequency increases, the conversion of $C_6H_5CH_3$ also increases. Conversion is considerably higher in an atmosphere containing Ar or He than in $N_2$ or Air alone.

TABLE 2-continued

Figure 9:
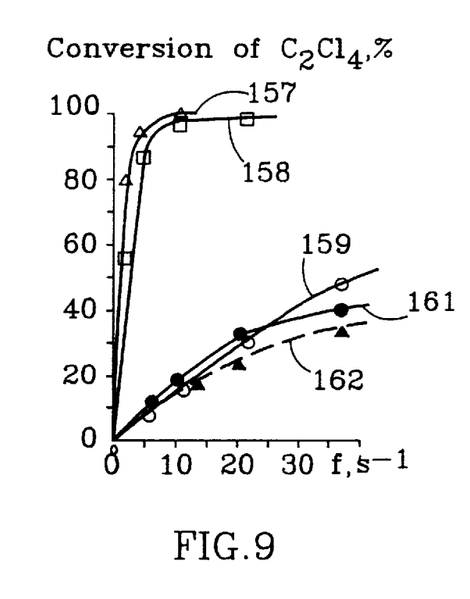
FIG. 9 is a graph comparing the effect of high voltage pulse frequency on the conversion of tetrachloroethylene in various types of gases.

FIG. 9: EFFECT OF FREQUENCY, f(s$^{-1}$) ON CONVERSION OF TETRACHLORO-ETHYLENE (C$_2$Cl$_4$) IN DIFFERENT TYPES OF GASES

Setup:

Temperature = 20° C.
Flow Rate = .51/min
Stainless-steel Electrode (1 mm)
Chamber Volume = 1.51
U$_{pulse}$ = 60 kV
Initial Concentration of C$_2$Cl$_4$ = 160 ppm
Legend:

157 = He
158 = Ar
159 = N$_2$
161 = Air
162 = CO$_2$
Conclusions:

As frequency increases, the conversion of C$_2$Cl$_4$ also increases. Conversion is dramatically higher in an atmosphere containing He and Ar, than in N$_2$, Air, or CO$_2$ alone.

Figure 10:
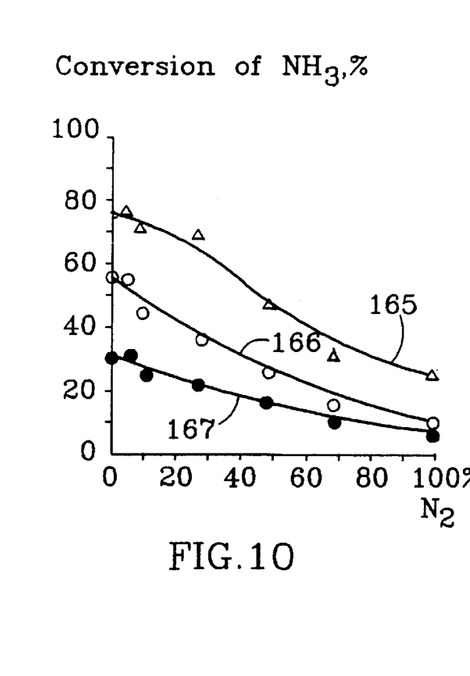
FIG. 10 is a graph comparing the effect of mixtures of argon and nitrogen on the conversion of ammonia.

FIG. 10: EFFECT OF Ar/N$_2$ MIXTURES ON THE CONVERSION OF AMMONIA (NH$_3$)

Setup:

Temperature = 20° C.
Flow Rate = .51/min
Stainless-steel Electrode (1 mm)
Chamber Volume = 1.51
U$_{pulse}$ = 60 kV
Initial concentration of NH$_3$ = 1300 ppm
Legend:

165 = frequency 35 f(s$^{-1}$)
166 = frequency 20 f(s$^{-1}$)
167 = frequency 10 f(s$^{-1}$)
Conclusions:

As the concentration of Ar increases, the conversion of NH$_3$ also increases.

Figure 11:
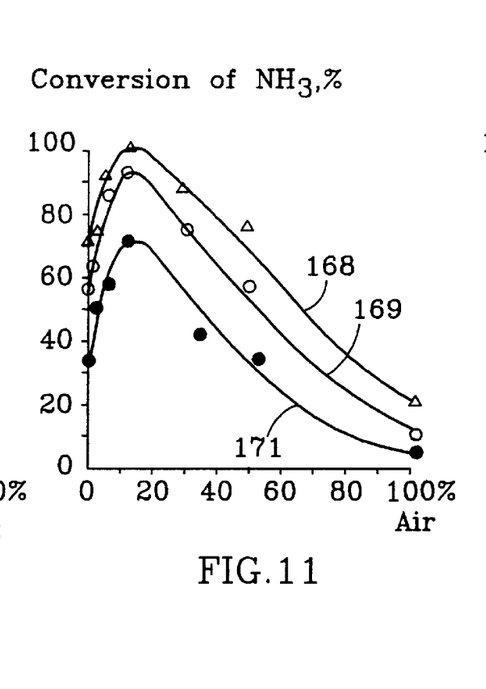
FIG. 11 is a graph comparing the effect of composition of mixtures of argon and air on the conversion of ammonia.

FIG. 11: EFFECT OF COMPOSITION OF Ar/AIR MIXTURES ON CONVERSION OF AMMONIA (NH$_3$)

Setup:

Temperature = 20° C.
Flow Rate = .51/min
Stainless-steel Electrode (1 mm)
Chamber Volume = 1.51
U$_{pulse}$ = 60 kV
Initial Concentration of NH$_3$ = 1300 ppm
Legend:

168 = frequency 35 f(s$^{-1}$)
169 = frequency 20 f(s$^{-1}$)
171 = frequency 10 f(s$^{-1}$)
Conclusions:

As the concentration of Ar increases, the conversion of NH$_3$ also increases. Optimum conversion is with an Ar/Air mixture of from about 55% to about 98% of Ar by volume. The maximum conversion is with an Ar/Air mixture of from about 78% to about 93% of Ar by volume.

Figure 12:
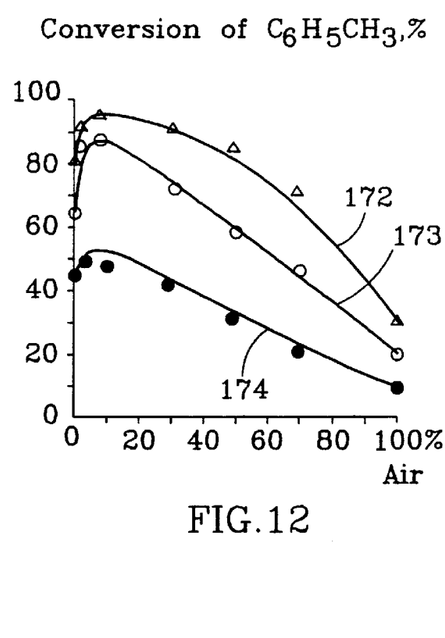
FIG. 12 is a graph comparing the effect of composition of mixtures of argon and air on the conversion of toluene.

FIG. 12: EFFECT OF Ar/AIR MIXTURES ON THE CONVERSION OF TOLUENE (C$_6$H$_5$CH$_3$)

Setup:

Temperature = 20° C.
Flow Rate = .51/min
Stainless-steel Electrode (1 min)
Chamber Volume = 1.51
U$_{pulse}$ = 60 kV
Initial Concentration of C$_6$H$_5$CH$_3$ = 720 ppm

TABLE 2-continued

Legend:

172 = frequency 35 f(s$^{-1}$)
173 = frequency 20 f(s$^{-1}$)
174 = frequency 10 f(s$^{-1}$)
Conclusions:

As the concentration of Ar increases, the conversion of toluene also increases. Optimum conversion is with an Ar/Air mixture of from about 80% to about 98% of Ar by volume. The maximum conversion is with an Ar/Air mixture of from about 83% to about 98% of Ar by volume.

Figure 13:
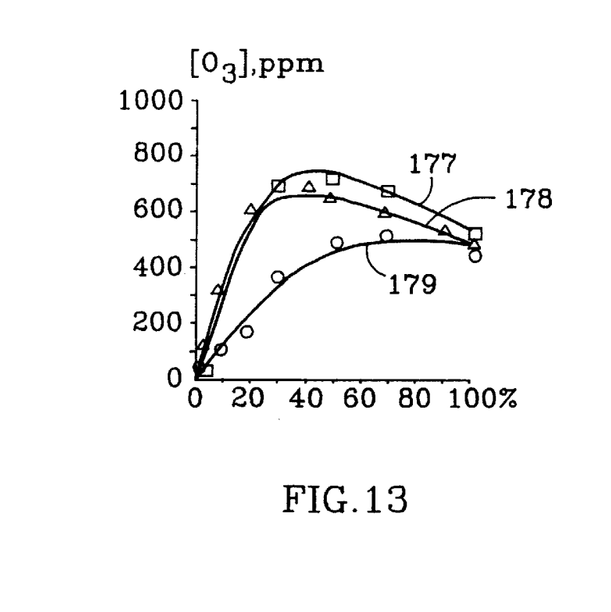
FIG. 13 is a graph comparing the effect of composition of mixtures of various inert gases and air on the production of ozone.

FIG. 13: EFFECT OF AIR/INERT GAS MIXTURES ON THE PRODUCTION OF OZONE (O$_3$)

Setup:

Temperature = 20° C.
Flow Rate = .51/min
Stainless-steel Electrode (1 mm)
Chamber Volume = 1.51
Frequency, f = 35 s$^{-1}$
U$_{pulse}$ = 60 kV
Legend:

177 = He
178 = Ar
179 = N$_2$
Conclusions:

As the concentration of N$_2$ increases, the concentration of O$_3$ decreases. In the case of He and Ar, as the oncentrations of these gases increase the concentration of O$_3$ also increases. Beyond maximum concentrations of about 50% He, 45% Ar and 80% N$_2$, O$_3$ production begins to drop. Optimum production of O$_3$ is with an Ar(He)/Air mixture of from about 15% to about 75% of Ar or He by volume. The maximum production is with an Ar(He)/Air mixture of from about 25% to about 55% of Ar or He by volume.

Our analysis of the test results confirms that at high concentrations of pollutants in mixtures of noble gas and air the precipitator employing only a pulse corona discharge is preferable to the patented device employing a combination DC and pulse corona discharge. For contaminated noble gases without electronegative additives (air, CO$_2$, etc.) the only option for avoiding electrical breakdown and arcing is a reactor utilizing a nanosecond pulse corona discharge initiated by 2n-stage Fitch generator.

This type of device operating in an atmosphere of noble gases (He, Ne, Ar, Kr, Xe) is a powerful instrument for production of high concentrations of metastable, electronically excited atoms (He*, Ne*, Ar*, Kr*, Xe*). From our test results it is apparent that the patented reactor incorporating a Fitch generator enhanced in the manner disclosed here may be used on an industrial scale for ridding contaminated noble gases of impurities as well as for converting hazardous contaminants (eg., NH$_3$, PH$_3$, AsH$_3$, VOC$_s$, and the like) to harmless by-products.

It will be appreciated that while particular embodiments of the invention have been shown and described, modifications may be made. It is intended in the following claims to cover all such modifications that fall within the true spirit and scope of the invention.

We claim:

1. In combination with an electrical apparatus for removing noxious substances from a stream of fluid, the apparatus having an electrical precipitator including a reaction chamber through which a stream of fluid passes and a corona-producing electrode extending into the reaction chamber, a power supply including a frequency converter for converting three-phase alternating current line voltage having a frequency of the order of 50–60 Hz to single-phase voltage having a frequency of the order of 400 Hz, a transformer for raising the level of the voltage from the frequency converter to the order of 30–100 kV, and a rectifier for producing a rectified voltage output in response to an alternating current input; a multi-stage Fitch generator connected to said power supply and including a plurality of capacitive power storage units to be charged to a predetermined constant direct current voltage by the rectified voltage output of said power supply, said Fitch generator further including a trigger circuit connected to the power storage units, the trigger circuit including first switching means for causing the power storage units to produce a pulsating voltage and circuit means for causing rapid extinction of the first switching means discharge; circuitry connecting the output of the frequency converter to the trigger circuit, said connecting circuitry including a phase shifting network for causing the first switching means to be actuated only when the output of the frequency converter is at a minimum amplitude level; and circuit means connected to the power storage units for introducing the pulsating voltage to the corona-producing electrode;

a source of inert gas, which may include the aforementioned stream of fluid, connected to the reaction chamber;

a valve for controlling the admission of inert gas from said source into the reaction chamber;

a source of air, which may include the aforementioned stream of fluid, connected to the reaction chamber; and a valve for controlling the admission of air from said source into the reaction chamber thereby producing an atmosphere containing a predetermined mixture of inert gas and air within the reaction chamber, the mixture providing a concentration of electronically excited metastatic inert gas atoms effective to ionize the noxious substance in the stream of fluid in the reaction chamber.

2. The combination defined by claim 1, wherein the mixture comprises from about 55% to about 98% inert gas by volume.

3. The combination defined by claim 1, wherein the Fitch generator contains 2n-stages capacitive power storage units.

4. The electrical apparatus defined by claim 3, wherein the electrode comprises a monofilament wire mounted coaxially with the reaction chamber.

5. The combination defined by claim 1, comprising:

(2n+1)-stages of capacitive power storage units in the Fitch generator, whereby the pulsating voltage introduced to the corona-producing electrode is superimposed on the constant charged direct current voltage, and second switching means in the circuit means for selectively bypassing one of said stages of power storage units, introducing only the pulsating voltage to the corona-producing electrode.

6. The electrical apparatus defined by claim 5, wherein the electrode comprises a multi-edged serrated column mounted coaxially with the reaction chamber.

7. An electrical precipitator for removing noxious substances from a stream of fluid, said precipitator incorporating the electrical apparatus defined by claim 1.

8. The combination defined by claim 1, wherein the mixture comprises from about 78% to about 93% inert gas by volume.

9. A method for removing noxious substances from a stream of fluid, comprising:

providing an electrical precipitator including a reaction chamber through which a stream of fluid passes and a corona-producing electrode extending into the reaction chamber;

providing a power supply including a frequency converter for converting three-phase alternating current line voltage having a frequency of the order of 50–60 Hz to single-phase voltage having a frequency of the order of 400 Hz, a transformer for raising the level of the voltage from the frequency converter to the order of 30–100 Kv, and a rectifier for producing a rectified voltage output in response to an alternating current input;

providing a multi-stage Fitch generator connected to said power supply and including a plurality of capacitive power storage units to be charged to a predetermined constant direct current voltage by the rectified voltage output of said power supply, said Fitch generator further including a trigger circuit connected to the power storage units, the trigger circuit including first switching means for causing the power storage units to produce a pulsating voltage and circuit means for causing rapid extinction of the first switching means discharge;

providing circuitry connecting the output of the frequency converter to the trigger circuit, said connecting circuitry including a phase shifting network for causing the first switching means to be actuated only when the output of the frequency converter is at a minimum amplitude level;

providing circuit means connected to the power storage units for introducing the pulsating voltage to the corona-producing electrode;

causing the fluid stream to pass through the reaction chamber;

causing an inert gas to be admitted into the reaction chamber and comingled with the fluid stream; and causing a mixture of an inert gas and air to be admitted into the reaction chamber and commingled with the fluid stream thereby producing an atmosphere containing a predetermined mixture of inert gas and air within the reaction chamber, the mixture providing a concentration of electronically excited metastatic inert gas atoms effective to ionize the noxious substances in the stream of fluid in the reaction chamber.

10. The method for removing noxious substances from a stream of fluid defined by claim 9, wherein the mixture comprises from about 55% to about 98%, inert gas by volume.

11. The combination defined by claim 10, wherein the mixture comprises from about 78% to about 93% inert gas by volume.

12. The method for removing noxious substances from a stream of fluid defined by claim 9, comprising providing a Fitch generator containing 2n-stages of capacitive power storage units.

13. The method for removing noxious substances from a stream of fluid defined by claim 9, comprising:

providing a Fitch generator containing (2n+1)-stages of capacitive power storage units, whereby the pulsating voltage introduced to the corona-producing electrode is superimposed on the constant charged direct current voltage; and providing second switching means in the circuit means for selectively bypassing one of said stages of power storage units, thereby introducing only the pulsating voltage to the corona-producing electrode.

14. The method for removing noxious substances from a stream of fluid defined by claim 9, wherein the electrode comprises a wire mounted coaxially with the reaction chamber.

15. The method for removing noxious substances from a stream of fluid defined by claim 9, wherein the electrode comprises a multi-edged serrated column mounted coaxially with the reaction chamber.

* * * * *